May 28, 1963     B. VAN ARRAGON     3,091,742
LIMITING CIRCUIT FOR A TIME MODULATOR
Filed Sept. 14, 1959     2 Sheets-Sheet 1

FIG. 1

INVENTOR.
BERNARD VAN ARRAGON
BY Frederick E. Hans
ATTORNEY

INVENTOR.
BERNARD VAN ARRAGON
BY Frederick E. Hane
ATTORNEY

United States Patent Office

3,091,742
Patented May 28, 1963

3,091,742
LIMITING CIRCUIT FOR A TIME MODULATOR
Bernard van Arragon, Delden, Overijssel, Netherlands, assignor to N.V. Hollandse Signaalapparaten, Hengelo, Overijssel, Netherlands, a Dutch corporation
Filed Sept. 14, 1959, Ser. No. 839,783
Claims priority, application Netherlands Sept. 15, 1958
15 Claims. (Cl. 332—9)

This invention relates to a system comprising a time modulator circuit and a pulse circuit applying control pulses to this time modulator circuit, the latter circuit reacting to such a control pulse by passing from a condition of rest into an operative condition, and returning into its condition of rest after a time interval determined by an adjustable control voltage, the system being provided with a limiting circuit, which limits the control voltage to values corresponding to durations of the said time interval which are larger than a certain predetermined minimum value. This type of circuit is generally applied as gating circuit in radar apparatus. Such a gating circuit comprises a time modulator, which is caused to change from a condition of rest to an operative condition by a synchronizing or control pulse and returns to the condition of rest after a variable interval determined by a control voltage. When the time modulator returns to its condition of rest it supplies a pulse which initiates the generation of two successive gating pulses. Each of the gating pulses temporarily opens a gating circuit to which video pulses are applied. Each gating circuit is connected to an integrating circuit, and as far as a video pulse overlaps a gating pulse it flows through the gating circuit controlled by this gating pulse and the corresponding integrating circuit. Consequently integrated voltages, determined by the measure in which the two gating circuits permit the video pulses to pass, will be present across the terminals of the integrating circuits. These voltages will be equal if the ratio of the parts of the video pulses flowing through the two gating circuits has a certain value. If this ratio has another value, one of the two integrated voltages is higher than the other. These two voltages are applied to a differential amplifier, amplifying the difference of these voltages and applying the amplified difference to a circuit integrating with respect to time. This integrating circuit supplies a voltage, the rate of change of which is determined by the output voltage of the differential amplifier, and which is applied as control voltage for the time modulator. This control voltage, and consequently the moment of occurrence of the gating pulses, will then remain unchanged if the moment of occurrence of the video pulses with respect to the gating pulses is such that the voltages across the terminals of the two integrating circuits are equal. If the video pulses are able to pass the gating circuits but occur at another moment with respect to these gating pulses, the said voltages will be unequal and the differential amplifier will supply a voltage to the circuit integrating with respect to time, which causes a change of the control voltage for the time modulator, and consequently of the moment of occurrence of the gating pulses. The polarity of the various voltages is such that the moment of occurrence of the gating pulses is continuously adapted to the moment of occurrence of the video pulses. Circuits of the type described above are also applied in apparatus for measuring range and direction by means of acoustical echoes in electronic analogue computers, in systems for remote control and remote measuring as well as in regulators operating with pulses the duration of which corresponds to a certain measured value, or with pulses the separation of which is determined by a measured value.

In systems of the type described above it is, as a rule, inadmissible for the control voltage to correspond to a negative duration of the operative condition of the time modulator circuit, because the time modulator circuit is unable to react in a correct way to such voltages. It is, moreover, in many cases desirable for the duration of the operative condition to possess a certain minimum value, which, as a rule, is small. In radar apparatus, for instance, the area in the immediate vicinity of the apparatus is, as a rule, made inaccessible to measurement, because many ground-echoes are produced in this area. This is effected by limiting the control voltage of the time modulator. For this purpose in most systems of this type the circuit providing the control voltage to the time modulator, or a circuit the potential of which determines the value of the said control voltage, is connected to a source of constant voltage by way of a device conducting in one direction only. This constant voltage corresponds to the minimum duration of the operative condition, and the direction in which the diode can become conductive is such that it is non-conductive as long as the control voltage has a value causing the time modulator to remain in the working condition longer than during the minimum interval. If the device determining the control voltage, such as the circuit integrating with respect to time in a radar gate circuit, tends to adjust this voltage to a value which is not within the limits determined by the constant voltage, then the diode becomes conductive so that owing to the fact that the constant voltage is applied by way of a circuit the resistance of which is low with respect to the other resistances in the control circuit, the control voltage obtains the value of this constant voltage and cannot pass beyond this limit. The constant voltage may be adjustable in order to regulate the minimum duration. The limiting method described above does not, however, permit a sharp limitation of the voltage and of the interval determined by this voltage, owing to the fact that the variation of the voltage required for changing the resistance of the diode from a high one into a low one is fairly large and by no means negligible in comparison with the changes of the control voltage.

If the object of the limiter is to prevent the control voltage from obtaining values corresponding to a negative duration of the operative condition, the minimum duration of the operative condition should be relatively large because of the lack of definition of the limiting operation. If the object of the limiting operation is to define an arbitrary positive adjustable minimum duration, then this duration is not exactly defined. In both cases the lack of definition may be objectionable. For reasons of safety working areas must be excluded, although the properties of these areas do not require this exclusion.

It is, therefore, important to have the disposal of a circuit which is able to limit the control voltage at exactly a given value. According to the invention a sharply defined limitation of the control voltage and, consequently, of the duration of the operative condition of the time modulator is made possible by building the system in such a way that it cooperates with a pulse generator which generates limiting pulses commencing at a moment which is the same as, or differs only slightly from the moment at which the limitation must occur, and ends at a moment which, apart from a possible maximum value of the duration of the limiting pulse, is the same as or differs only slightly from the moment at which the time modulator returns to its condition of rest, whilst pulses, corresponding to the said limiting pulses, are applied to an auxiliary circuit provided with a first switching element, which reacts to the limiting pulse by bringing the auxiliary circuit into a condition in which the output voltage of the auxiliary circuit changes in a direction to a limit value, whilst the time constants of the circuits concerned are such that the limit value is reached within an interval which is small with respect to the interval between two successive control pulses, and which switching element, when no limiting pulse voltage is present, brings the auxiliary circuit into a condition in which the difference between the output voltage of the auxiliary circuit and the limit value increases with a time constant which is large with respect to the recurrence interval of the control pulses, the said output voltage being applied to control a second switching element in such a way that as soon as the said output voltage differs more from the limit value than to a certain extent, it connects a point, the potential of which defines the control voltage, with a point in the limiting circuit, the voltage of which, in any case as long as the said connection is present, will have a value corresponding to a value of the control voltage which defines a time interval smaller than the minimum value.

In some systems according to the invention the time modulator circuit itself supplies the limiting pulses. Parts of the time modulator circuits are then applied as pulse generator for generating the limiting pulses. In other systems the time modulator circuit only produces a pulse when it returns to its condition of rest and in this case the limiting pulse must be supplied by a separate circuit which is controlled by the control pulse bringing the time modulator into its working condition as well as by the pulse supplied by the time modulator circuit itself. In an effective system of this type a bi-stable trigger circuit is influenced in opposite sense by the said pulses, and supplies the limiting pulse whilst it is in the condition into which it is brought by the control pulse.

If it is the object of the limiting circuit to prevent the control voltage from obtaining values corresponding to a negative duration of the operative condition, then it is possible for the limiting pulse to commence at about the same moment at which the time modulator reaches its operative condition. If in this case the minimum duration of the operative condition should be very short, a very rapid rise of the output voltage of the auxiliary circuit is required. Such a steep change of the output voltage tends, however, to make the system unstable. This objection can, however, be met by making the time constant of the change of the output voltage to which the system is adjusted during the occurrence of the limiting pulse, slightly larger, so that the output voltage will change less steeply and by causing the limiting pulse to start slightly before the moment at which the time modulator has reached its operative condition. In radar apparatus this can be realized as follows: Each cycle of the radar apparatus is initiated by a pre-synchronizing pulse. This pre-synchronizing pulse itself initiates the limiting pulse. The transmitting pulse is initiated indirectly by way of a second synchronizing pulse which is derived from the pre-synchronizing pulse with a slight delay. If, on the other hand, it is desirable that the limiting should occur after a larger time interval, which may be adjustable, then the limiting pulse is initiated by the control pulse by way of a delay circuit such as a monostable trigger circuit, which is brought into its operative condition by the control pulse and returns to its condition of rest after an adjustable interval, thereby causing a limiting pulse to commence.

The required time constants can be obtained in various ways. In one form according to the invention the limiting pulse passes a smoothing network, causing the pulse to reach its top value only after an interval which is, however, small with respect to the interval between two successive control pulses. The duration of this interval is of the same order as the inaccuracy which is admissible for the moment of occurrence of the limiting action. The output voltage of the network is applied to a circuit comprising a rectifier and a condenser, or may control a cathode follower the cathode circuit of which comprises a condenser. In both cases the circuit in which the said output voltage influences the condenser voltage has a low time constant. The condenser voltage will, consequently, substantially correspond to the instantaneous value of the output voltage of the smoothing network. If the duration of the limiting pulse is such that eventually the output voltage of the network substantially corresponds to the pulse voltage, the condenser voltage will also substantially correspond to the pulse voltage. If, however, at the moment at which the limiting pulse ends, the output voltage of the network is still increasing, then the condenser voltage will have a lower value at the moment the limiting pulse ends. The condenser is shunted by a circuit, the time constant of which is fairly large with respect to the recurrence interval of the control pulses. The current in this shunt circuit will cause the condenser voltage to remove itself from the value reached during the limiting pulse, but because of the high time constant of this circuit the rate of change is small. If the limiting pulses have a relatively large duration the condenser voltage will vary about a value which differs only slightly from the value corresponding to the pulse voltage itself, but if the duration of the limiting pulses is substantially shorter, the condenser voltage will have a value which is nearer to the value of rest of the condenser voltage. The condenser voltage is the output voltage of the auxiliary circuit. It may control the limiting action in various ways. In one form according to the invention it controls an electronic switch, and if the condenser voltage differs to at least a given extent from the voltage corresponding to the limiting pulse voltage, then this electronic switch connects a point in the circuit the potential of which determines the control voltage for the time modulator for instance the input circuit of a Miller integrator which supplies this control voltage, with a point with a fixed potential, so that the control voltage will no longer be changed. A more effective circuit is obtained if the output voltage of the auxiliary circuit and the potential of the circuit, the potential of which determines the control voltage, change in opposite sense when the duration of the operative condition of the time modulator changes, provided that the formed voltage has still not reached its limit value. The sense of these changes is such that the voltage difference decreases when the duration of the operative condition decreases. As soon as the control voltage reaches its limit value the output voltage of the auxiliary circuit and the potential determining the control voltage are substantially equal, and the output circuit of the auxiliary circuit is connected to a point in the circuit the potential of which determines the control voltage by means of a rectifier or by means of a cathode follower controlled by the output voltage of the auxiliary circuit. The direction of the connection is such that the rectifier or the cathode follower are non-conductive as long as the output voltage of the auxiliary circuit corresponds to its limit value, or differs slightly from this limit. If the duration of the operative condition decreases to such an extent that the output voltage of the smoothing network does not reach its limit, then the output voltage of the auxiliary circuit approaches the potential of the point the potential of which must be limited, and these voltages will become equal if this operative condition has a certain duration. Then the rectifier or the cathode follower becomes conductive and any further change of the control voltage in the sense of a shortening of the duration of the operative condition is prevented.

In another form of the circuit according to the invention the limiting pulse is not intentionally smoothed but is applied in its original shape to a circuit comprising a rectifier and a condenser, or applied to the control grid of a cathode follower the cathode circuit of which comprises a condenser. In this case, however, the time constant of the condenser circuit is not kept as low as possible but has such a value that the condenser voltage only obtains the value corresponding to the pulse voltage after a short interval. Just as the delay interval caused by the smoothing network of the previous example, this interval has a duration which is of the same order as the admissible inaccuracy of the moment of occurrence of the limiting action. In a similar way as in the previous example, a shunt circuit with a high time constant shunts the condenser. The condenser voltage will adjust itself to such a value that the change of the charge resulting from the current in the shunt circuit whilst no limiting pulse is present is equal to the change of the charge resulting from the current in the rectifier or the cathode follower during the presence of the limiting pulse, and will be nearer to the limit defined by the pulse voltage as the duration of the limiting pulse is larger. Also in this circuit the condenser voltage is the output voltage of the auxiliary circuit and can be applied in the way described above in order to effect the the limiting action.

As a matter of fact the condenser circuit in the first example will have no infinitely small time constant, whilst on the other hand the limiting pulse in the second example will not remain completely unsmoothed. Consequently in practice, all circuits will operate more or less according to a combination of both methods, but depending on the time constants of the various parts of the circuit, the system will, as a rule, operate mainly by the first method or mainly by the second method.

For two reasons the circuit according to the invention permits a much sharper limitation of the control voltage. In the first place the limitation of the control voltage will, in any case, occur during that part of the limiting pulse in which the output voltage of the auxiliary circuit is still increasing and the duration of this part can be made very short and accurately defined either by the character of the smoothing network or by the time constant of the condenser circuit. Variations of the pulse voltage will cause a slight variation of the output voltage of the auxiliary network and consequently of the moment of occurrence of the limitation, but this moment will, in any case, still be situated within the accurately defined duration of the above mentioned interval. Moreover, the diode or the electronic switch is unable to exert any substantial influence on the operation of the circuit because the moment at which this circuit element becomes conductive is no longer determined by the variations of the control voltage itself but by the variation of a voltage the variation of which can be substantially larger than the variation of the control voltage itself.

The invention will now be elucidated by describing circuits according to the invention with reference to the drawings.

Figure 1:
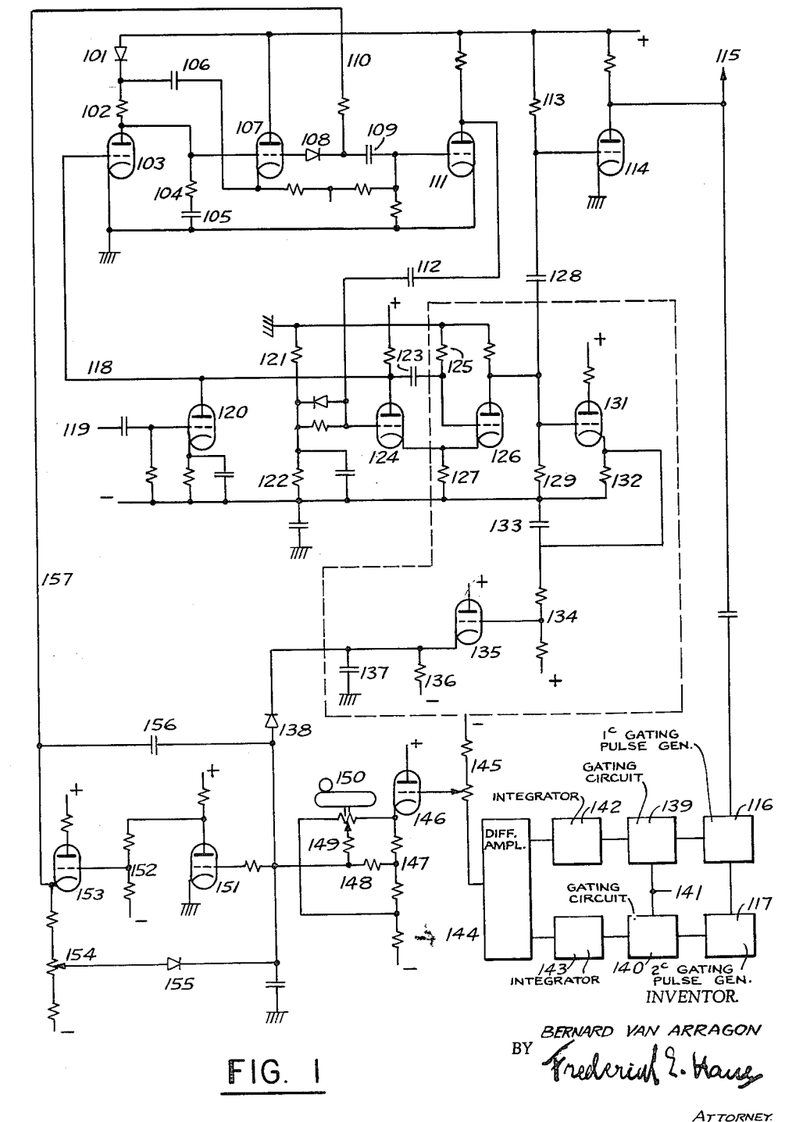
FIG. 1 shows, partly as block circuit, a gating pulse circuit of a radar apparatus provided with a limiting circuit according to the invention.

The upper part of FIG. 1 shows the circuit of a time modulator of a radar apparatus which initiates the first gating pulse when an interval determined by the control voltage applied by way of the conductor 157 has elapsed after the reception of a synchronizing pulse. At the lower right hand side the gating pulse generators 116, 117, the gating circuits 139, 140, with corresponding integrating circuits 142, 143 and the differential amplifier 144 are shown in block diagram. A Miller condenser, used as a circuit integrating with respect to time, and supplying the control voltage for the time modulator, is shown at the lower left hand side, whilst the limiter circuit according to the invention is shown in the centre of the figure.

Positive synchronizing pulses are applied to the terminal 119 and flow to the grid of the tube 120, making this grid positive, so that the anode current of this tube will be increased and its anode potential will decrease. This potential decrease is applied to the grid of the tube 126 by way of condenser 123, causing this tube, which in the state of rest of the circuit is conductive, to become non-conductive. The anode voltage increase resulting therefrom has no influence on the pulse generator. The current decrease in the cathode resistor 127, however, causes a decrease of the potential of the cathode of tube 124, and as this tube obtains a constant grid potential which is determined by the voltage divider 122, 121, and is higher than the cathode potential when no current flows in the resistance 127, the said tube becomes conductive, so that the potential of the anodes of the tubes 124 and 120 remains low. For the time being the grid potential of the tube 126 also remains low, because the circuit consisting of the resistance 125 and condenser 123 has a relatively large time constant. This time constant is so large that the change of the voltage across the condenser 123 will in no case cause the tube 126 to become conductive before the occurrence of the next synchronizing pulse. The voltage decrease of the anode of the tube 120 is also applied to the grid of the tube 103, so that this tube, which is normally conductive, now becomes blocked. Consequently the condenser 105 is charged in a circuit comprising the resistances 102 and 104. In order to obtain a linear change of the voltage across this condenser as a function of time, the circuit in which this condenser is charged is a bootstrap-circuit. The voltage across the condenser 105 and the resistance 104 is, for this purpose, applied to the grid of the cathode follower 107, the cathode of which is connected by way of a large condenser 106 to the upper terminal of the resistance 102. The condenser 106 transfers the increase of the cathode potential of the tube 107 resulting from the increase of the voltage across the condenser 105 to the upper terminal of the resistance 102, causing the rectifier 101 to become blocked. The condenser 106 is large with respect to the condenser 105, so that the charging current of the latter condenser will not cause a substantial change of the voltage across the condenser 106. Consequently the voltage across the resistance 102, and, therefore, the current by which the condenser 105 is charged, remain substantially constant, so that the voltage across the condenser 105 substantially changes as a linear function of time. The linearly increasing condenser voltage is compared with the control voltage which is present at the conductor 110, and as soon as the condenser voltage exceeds this control voltage the diode 108 becomes conductive, causing a positive pulse to be applied by way of condenser 109 to the grid of the tube 111. This tube supplies a negative pulse by way of condenser 112 to the grid of the conductive tube 124, which consequently becomes blocked. This causes a sudden potential increase of the anode of this tube which is applied to the grid of the tube 126 by way of condenser 123, so that the latter tube becomes conductive. As soon as this tube is conductive, a voltage drop occurs in the cathode resistance 127 such that the tube 124 obtains a negative grid voltage, causing this tube to remain blocked, after the negative pulse provided by the tube 111 has come to an end. The increased anode voltage of the tube 124 causes the tube 103 to become conductive, so that the condenser 105 is discharged, and the operation of the bootstrap-sawtooth generator is interrupted.

When the tube 126 becomes conductive, this causes a sudden decrease in the potential of the anode of this tube, which, by way of condenser 128, is applied to the grid of the amplifier tube 114. This tube, consequently, supplies a positive voltage pulse to the gating pulse generator 116 and, by way of conductor 115, a pulse to the cathode ray tube of the display screen on which the echoes and the gating pulses are displayed. The duration of this latter pulse is determined by the R.C. circuit with the resistance 113 and the condenser 128 in the grid circuit of the tube 114. Reacting to the reception of the positive voltage pulse supplied by the tube 114, the gating pulse generator 116 supplies a pulse to the second gating pulse generator 117 and applies a gating pulse to the gating circuit 139. The second gating pulse generator 117 is built in such a way that it becomes operative at the end of the applied pulse and then supplies a gating pulse to the gating circuit 140. Video pulses derived from the echo pulses by the radar receiver are applied, by way of conductor 141, to both gating circuits 139 and 140, and if the gating pulses overlap the video pulses, each of the gating circuits will pass a part of every video pulse to its integrator circuit 142 or 143. The voltages appearing at these integrating circuits are determined by the parts of the video pulses which are able to flow through the two gating circuits. For a certain relative moment of occurrence of these pulses the two integrator circuits will have equal output voltages, in all other cases there will be a difference between the output voltages of the integrator circuits. The direction of this difference is determined by the direction of the deviation of the relative moment of occurrence at which equal voltages are supplied. The voltage difference is applied to a differential amplifier 144 which amplifies this voltage difference. The amplified voltage difference controls a cathode follower 146 by way of voltage divider 145. The cathode circuit of this cathode follower comprises two voltage dividers 147 and 150 in parallel, the latter susceptible of being adjusted by means of a handwheel. When the gating circuit is automatically controlled, as described here, the handwheel is in its position of rest in which the tap of the adjustable voltage divider has the same potential as that of the fixed voltage divider. The taps of both voltage dividers are connected by way of the resistances 148 and 149 to the input terminal of the Miller integrator. This integrator comprises the amplifier tube 151, the cathode follower 153 and the integrating condenser 156. If, as a result of an incorrect relative moment of occurrence of echo- and gating pulses a voltage differing from the voltage of rest, for instance a voltage which is more positive than the voltage of rest, is supplied by the voltage divider circuit, then the grid voltage of the tube 151 will become higher. As a result of this change the anode voltage of the tube 151 and consequently also the cathode potential of the cathode follower 153 should be decreased. The condenser 156, however, constitutes a negative feed back circuit for the amplifier and no change in the output potential of the Miller integrator can occur without changing the charge of this condenser. The charge of this condenser can, however, only be changed by a current flowing in a circuit which, besides the condenser, also comprises the voltage dividers 147 and 150 and the resistances 149 and 148 of the voltage divider circuit in the output circuit of the differential amplifier. In this circuit charge is supplied to or drained from the condenser, so that the voltage across this condenser and, because the resistances included in this circuit are fairly high, the output voltage of the Miller integrator can only change slowly. As long as, for instance, the potential of the voltage divider output circuit deviates in a positive direction from the potential of rest, the condenser 156 will be gradually charged, permitting the cathode potential of the cathode follower 153 to be decreased. As a result of the decrease in this cathode potential the voltage of the control conductor 157, 110 is decreased, so that the diode 105 becomes conductive earlier and the time modulator remains in its operative condition for a shorter interval. If, on the other hand, the output voltage of the voltage divider circuit deviates in a negative sense from the potential of rest, then the anode voltage of the tube 151 and the cathode voltage of the cathode follower 153 will be increased, so that the potential of the conductor 110 is increased and the diode 108 will become conductive later, so that the time modulator remains in its operative condition during a longer interval. In this way the moment of occurrance of the gating pulses is adapted to the moment of occurrence of the pulses applied to the circuit after gating pulses and applied pulses have once been made to overlap. In order to bring about the coincidence of gating pulses and applied pulses the control voltage can be influenced by means of the handwheel of the adjustable voltage divider 150, whilst gating pulses and applied pulses are observed in a way well known in the art on the screen of a cathode ray tube.

As is customary in radar apparatus means are provided for limiting the range to an area comprised between a maximum and a minimum value. This limiting action is effected by limiting the control voltage of the time modulator. This might be effected by limiting the output voltage of the Miller integrator, but this would have the following disadvantage. Be it assumed that the control voltage has reached its upper limit, but that for instance, the manually controlled voltage divider still supplies a voltage which tends to increase the output voltage of the Miller integrator. A limiting circuit which, for instance, connects the output circuit of the Miller integrator by way of a diode to a point of fixed potential might then prevent a further increase of the control voltage but is unable to prevent the output voltage of the voltage divider from reaching the input circuit of the integrating condenser. This voltage charges the integrating condenser to a voltage which is higher than that which corresponds to the limit value of the output voltage of the Miller integrator. This is possible because, as a result of the limiting circuit becoming conductive, the amplification of the Miller integrator amplifier stages is decreased. Should at a later moment, the output voltage of the voltage divider stage obtain a value corresponding to a decrease of the control voltage, then the control voltage would nevertheless be unable to decrease before the charge of the condenser had been reduced to a value corresponding to the limit value of the control voltage. For this purpose the condenser must be discharged in the integrating circuit which comprises fairly large resistances, so that this voltage decrease will take longer than is admissible. In order to avoid this objection, instead of the output voltage, the input voltage of the Miller integrator is limited, and as every value of the input voltage corresponds to a corresponding value of the output voltage, the output voltage is, in this way, also limited. If a standard limiting circuit in which the point, the potential of which must be limited, is connected by way of a diode to a point of fixed potential, the limiting of the input voltage of the Miller integrator would have been objectionable, because the range of this voltage is so small and more or less of the same order as the range in which the diode resistance changes from a high one into a low one. In the system according to the invention, however, the limiting action is effected by means of a strongly varying voltage which acts as a switching voltage and permits the input voltage of the Miller integrator to be sharply limited at a certain value. The upper limit of the control voltage and of the duration of the operative condition of the time modulator is effected in the normal way by way of a diode 155, because this limit need not be so sharply defined. The control voltage is increased when the input voltage of the Miller integrator is below its normal value. When the control voltage increases the potential of the tap of the voltage divider 154, which is connected to the diode 155, also increases. At a certain value of the control voltage the increasing voltage of this tap will reach the decreasing value of the input voltage of the Miller integrator. The diode 155 then becomes conductive, so that no further change of the control voltage in the same sense can occur, owing to the fact that the condenser 156 which is now shunted by the conducting diode 155 cannot be charged any further. The value at which this limiting action occurs is not so sharply defined, but for an upper limit this is no objection. The lower limit of the control voltage and consequently the minimum duration of the operative condition of the time modulator is determined by means of a device according to the invention. In the example described the limiting pulse is generated in the time modulator circuit by means of the tube 126. In the condition of rest of the circuit this tube is conductive, so that its anode voltage and consequently the grid voltage of the cathode follower 131 is low. As has been described above the tube 126 is non-conductive as long as the time modulator is in its operative condition, so that the anode voltage of this tube and consequently the grid of the cathode follower 131 and the cathode voltage of this cathode follower are high during this condition. Consequently the cathode follower furnishes at its cathode positive pulses which can be applied as limiting pulses. The anode circuit of the cathode follower 131 comprises a resistance and its cathode circuit a condenser, so that the cathode follower circuit operates as a smoothing network. Consequently the limiting pulse is applied to the grid of the cathode follower 135 in a slightly smoothed shape. The cathode follower 135 possesses a cathode resistance 136 shunted by a condenser 137. When it is conductive the tube 131 has a relatively low resistance so that the charging circuit of the condenser 137 by way of this tube has a very low time constant and the condenser 137 is charged substantially to the instantaneous value of the grid voltage of the cathode follower tube. Between the successive limiting pulses the tube 135 is non-conductive, and the condenser 137 then discharges itself through the cathode resistance 136 of this tube. This resistance is very high and the time constant of the discharging circuit of the condenser 137 is so large that the condenser only loses a small part of its charge between two successive limiting pulses. A diode connects one terminal of the condenser with the input circuit of the Miller integrator. As the limiting pulses originate whilst the tube 126 is non-conductive, these pulses are positive. The cathode follower 131 consequently also furnishes positive pulses, and the condenser 137 will therefore obtain a positive charge, giving a positive potential to its upper terminal. If the limiting pulses have a duration which is so long that the output voltage of the smoothing network constituted by the circuit of the cathode follower 131 reaches the limit determined by the pulse voltage, then the condenser 137 will also be charged to a voltage of a corresponding limit value. If the duration of the operative condition of the time modulator becomes shorter, then the limiting pulses also become shorter, and as soon as this duration reaches a given lower limit the output voltage of the smoothing network constituted by the circuit of the cathode follower 131 will no longer reach the value corresponding to the pulse voltage. The terminal voltage of the condenser 137 will then decrease. On the other hand, as described above, the input voltage of the Miller integrator increases, for the control voltage must become lower in order to shorten the duration of the operative condition of the time modulator. The said voltages have such values that when the limiting pulse is shortened to a certain extent but still not reduced to zero, the condenser terminal voltage is decreased to such an extent as a result of the discharging of the condenser 137 through the resistance 136 that the potential of the terminal connected to the diode 138 will correspond to the input potential of the Miller integrator, so that the diode 138 becomes conductive. From this moment on no further shortening of the duration of the operative condition of the time modulator is possible, for a further decrease of the control voltage applied to the conductor 157, 110, and consequently of the duration of the limiting pulse would tend to decrease the voltage across the condenser 137 still further, and such a decrease would result in a still lower input potential of the Miller integrator which would tend to increase the control voltage in this way preventing its decrease.

As may be derived from the above, the limiting operation occurs in any case during the interval in which the output voltage of the smoothing network constituted by the circuit of the cathode follower 131 reaches its limit value, i.e. during the first small part of the limiting pulse. In any case it is possible to arrange the circuit in such a way that during this interval the potential of the cathode of the cathode follower 135 passes the input potential of the Miller integrator, for the limiting pulses can be furnished with a fairly large voltage variation e.g. of 100 v. The potential of the cathode of the cathode follower 135 can, for instance, vary 100 v. whilst the duration of the limiting pulse varies within the very short interval during which the output voltage of the smoothing network reaches its top value. By means of a voltage divider the variation of 100 v. can be situated at such a level that the complete area in which the variation of the input potential of the Miller integrator occurs is comprised within this 100 v. interval, so that during this variation, occurring whilst the duration of the operative condition of the time modulator changes from zero to the duration of the interval during which the output voltage of the cathode follower 131 reaches its top value, the cathode voltage of the cathode follower 135 will in any case once become equal to the input voltage of the Miller integrator.

In the circuit described above the limiting pulse flows through a separate smoothing network. As has been described in the preamble the circuit can also operate without such a separate smoothing network. A circuit operating without such a separate network is obtained if the part comprised within the dotted lines in FIG. 1 is replaced by the part shown in FIG. 2. Just as in the circuit according to FIG. 1 the tube 126 of the time modulator of this circuit is non-conductive during the complete interval during which the time modulator is in its operative condition. During this interval the anode voltage of this tube is, therefore, high. As long as the time modulator is in its condition of rest the tube is conductive and its anode voltage low. Positive limiting pulses can, therefore, be derived from the anode of this tube. These positive limiting pulses are applied by way of a voltage divider 134, which determines their level, to the grid of the cathode follower 135. In contradistinction to the cathode follower 135 of FIG. 1, the anode circuit of this cathode follower comprises an anode resistance 158. Morevover the cathode circuit of this tube comprises a condenser 137 and a cathode resistance 136 shunting this condenser in a similar manner as is shown on FIG. 1. The tube 135 is non-conductive as long as no limiting pulse voltage is applied to its grid. As soon as a limiting pulse voltage occurs the tube immediately becomes conductive. The condenser 137 is then charged in a circuit through this tube and the anode resistance 158. This charging circuit has such a time constant, that after this tube has become conductive, the condenser voltage will not immediately correspond to the pulse voltage applied to the grid of said tube. Between the successive limiting pulses the tube 135 is non-conductive and the condenser 137 discharges itself through the cathode resistance 136. This discharging circuit has a high time constant so that the voltage across the condenser terminals will only show a limited change between successive limiting pulses. If the duration of the limiting pulses is large, then the condenser 137 will be charged to a terminal voltage corresponding to the pulse voltage and the terminal voltage between the successive pulses will only differ slightly from this value reached during the pulses. If on the other hand the limiting pulses have so short a duration that during these pulses the terminal voltage of the condenser 137 will not reach the value corresponding to the pulse voltage, then the condenser voltage will vary about such a value that the charge supplied to the condenser through the anode resistance 158 and the tube 135 during the occurence of the limiting pulse is equal to the charge lost between the pulses by discharge through the resistance 136. The charge supplied to the condenser by way of the tube 135 during a limiting pulse will be smaller according as the voltage across the condenser is higher and the duration of the limiting pulses is shorter. On the other hand a larger charge is drained from the condenser by way of the resistance 136 between sucessive pulses according as the condenser voltage is higher and the interval between the pulses is larger or, which amounts to the same thing, the duration of the pulses is shorter. Consequently, an equilibrium between supply and drain of charge will occur at a lower condenser voltage according as the pulses have a shorter duration, provided that the condenser voltage does not reach the value corresponding to the limiting pulse voltage during the occurrence of the limiting pulses. In a similar way as that described with reference to FIG. 1 for a certain reduction of the duration of the limiting pulse the condenser voltage will become so low that the diode 138 (FIG. 1) becomes conductive, as a result of which a limitation of the control voltage and consequently of the duration of the operative condition of the time modulator occurs.

Figures 2, 3, 4:
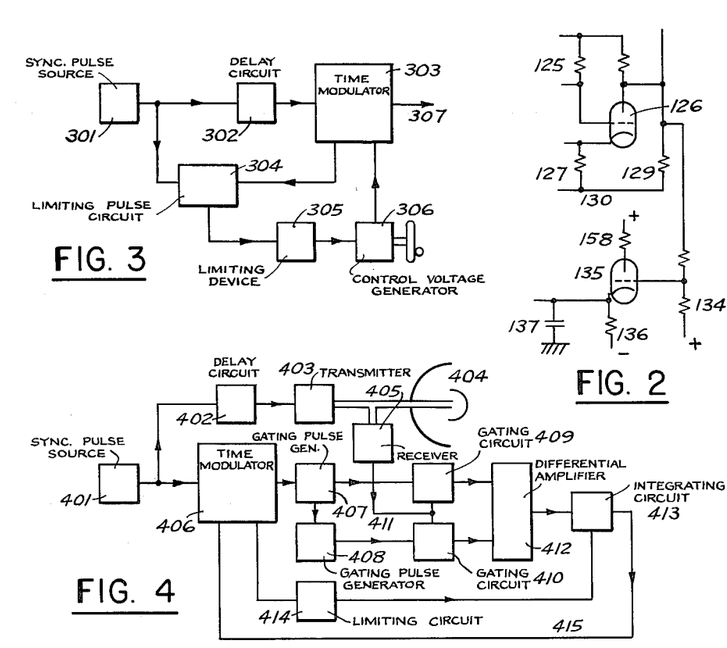
FIG. 2 shows another form of a part of the circuit according to FIG. 1.
FIG. 3 shows a block diagram of another form of a circuit according to FIG. 1.
FIG. 4 shows a block circuit of a radar apparatus in which the invention is applied.

It is obvious that on the one hand also in the circuit according to FIG. 2 a certain smoothing of the limiting pulses will occur, because no circuit is able to produce a perfect rectangular pulse, whilst on the other hand in the circuit according to FIG. 1 the time constant of the charging circuit of the condenser 137 by way of the tube 135 will still have some influence owing to the fact that the resistance of the tube is not negligible. Actually in these circuits the limiting action is influenced by the smoothing of the limiting pulse as well as by the time constant of the charging circuit of the condenser providing the limiting voltage. Preferably one of these two influences is made the most important by keeping the other influence as insignificant as possible. It is then easier to calculate the values of the electrical components in the circuit which are required for the desired operation.

The action limiting the duration of the operative condition always occurs during the interval in which the voltage across the condenser 137 increases as a function of the duration of the operative condition of the time modulator. In the examples described, the increase of this voltage begins at the same moment as the operative condition of the time modulator. If the limiting action should occur after a very short interval then the rise of the condenser voltage as a function of time must be very steep. Such a steep change has the disadvantage that it may easily lead to instability, because, for various reasons, the influence of the control voltage on the time modulator shows a certain delay, one of these reasons being the fact that this influence is exerted only periodically, i.e. directly after the reception of a synchronization pulse. It is, therefore, desirable to take such measures as may reduce the steepness of the voltage change required for a very small minimum duration of the operative condition. The point in the ascending part of the curve in which the limiting action occurs is determined by various voltages in the circuit. These voltages are not completely constant so that a drift of this point within the limits determined by the said ascending part is possible. This drift, however, will not occur along the full length of this ascending part, because the variations of the voltages are still relatively small. By suitably adjusting these voltages and the voltage dividers in the circuit, it is possible to situate the point at which the limiting action takes place with certainty within the last part e.g. the last third of this ascending part of the curve. The steepness of the voltage change can therefore be reduced by causing the limiting pulse to start at such a moment before the time modulator circuit changes over to its operative condition that the part of the ascending part of the curve in which the limiting action certainly will not take place has already been completed at the moment at which the time modulator switches over to its operative condition. This effect can be obtained in various ways, one of which is shown in the block circuit of FIG. 3. In this figure 301 is a source of synchronizing pulses. These pulses are directly applied to the circuit 304, which generates the limiting pulses. Moreover these pulses are applied to the time modulator 303 by way of a delay circuit 302. The delayed pulses, produced by this delay circuit bring the time modulator into its operative condition. Consequently a small interval elapses between the beginning of the limiting pulse supplied by the circuit 304 and the moment at which the time modulator reaches its working condition. Reference number 306 indicates a device which supplies a control voltage and which is shown here as a hand controlled device. After an interval which is determined by this control voltage the time modulator returns to its condition of rest, as a result of which it supplies a pulse to the circuit 307 as well as a pulse to the device 304 which generates the limiting pulse, causing this device to end this pulse. The limiting pulse is applied to a limiting device 305 which, for instance, can consist of a delay network and a condenser circuit with cathode followers, as has been described with reference to FIG. 1. This limiting circuit supplies a limiting voltage to the device 306 which generates the control voltage and in the way described with reference to FIG. 1, limits the voltage supplied by this device. The delay caused by the device 302 is such that at the moment at which the time modulator reaches its operative condition the output voltage of the delay network has already completed a considerable part of the ascending curve. For suitable values of the various voltages the limiting action occurs in the remaining part of the ascending curve.

It is a disadvantage of this circuit that the limiting pulse must be produced by a separate trigger circuit 304. This is expensive, if the interval between the moment at which the time modulator leaves its operative condition and another phenomenon initiated by the synchronizing pulse must be limited to a certain minimum value, as may be the case in radar apparatus in which the pulse produced by the time modulator and initiating the first gating pulse must in any case be generated later than the transmitter pulse, then other means can be applied in order to permit a very small minimum duration of the interval to be limited without a steep change of the voltage effecting the limiting action being required. FIG. 4 shows a block diagram of a radar apparatus operating in this way. Part 401 is a synchronizing pulse generator. Each synchronizing pulse is applied to the time modulator 406 which is bright into its working condition by such a pulse and which also supplies a limiting pulse in the way described with reference to FIG. 1. Each synchronizing pulse is, moreover, applied to the transmitter 403 by way of a delay circuit 402, and there initiates the transmission of a pulse of high frequency energy which is radiated by means of the aerial 404. Reference number 414 indicates a limiting circuit which comprises a delay network and which may be built in the way described with reference to FIG. 1. The delay caused by the device 402 is such that the output voltage of the delay network in the device 414 has already effected a substantial part of the ascending part of the curve, for instance two thirds of this ascending part at the moment at which the transmitter 403 transmits a pulse. After a time interval which is determined by the control voltage applied to the conductor 415, the time modulator returns into its condition of rest, supplying a pulse to the gating pulse generator 407, which is triggered thereby to produce a gating pulse which temporarily opens the gating circuit 409. The gating pulse is also applied to the second gating pulse generator 408, which generates the second gating pulse after the first gating pulse is finished, and applies this second gating pulse to the second gating pulse circuit 410 which, consequently, is opened temporarily directly after the closing of the first gating pulse circuit 409. The echo pulses which are received by the receiver 405 by means of the aerial 404 are applied to both gating circuits, and when the gating pulses are synchronized with the echo pulses the integrating circuits forming part of the gating circuits will be charged to voltages corresponding to the parts of the echo pulses flowing through both gating circuits. The difference of the voltages across the two integration circuits is applied to the differential amplifier 412, which amplifies the difference of these voltages and applies the amplified difference to a circuit 413 integrating with respect to time. This circuit generates the control voltage and applies it to the time modulator. The limiting pulses, generated by the time modulator, flow to a limiting circuit 414 and when the duration of these limiting pulses is so small that the output voltage of the circuit differs more than to a certain extent from the limit value of this voltage, a limiting action is exerted on the control voltage produced by the device 413 in the way described with reference to FIG. 1 or 2. In the system described the interval between the emission of a transmitter pulse and the moment at which the time modulator applies a pulse to the first gating pulse generator is shorter than the duration of the operative condition of the time modulator. Consequently a very small value of the lower limit of the interval between the emission of a transmitter pulse and the earliest moment at which the operative condition of the time modulator ends can be obtained by means of the limiting circuit according to the invention by causing the circuit to limit the duration of the operative condition of the time modulator at a minimum value which is substantially larger and which does not require an inadmissible steepness of the voltage changes in the limiting circuit.

Figure 5:
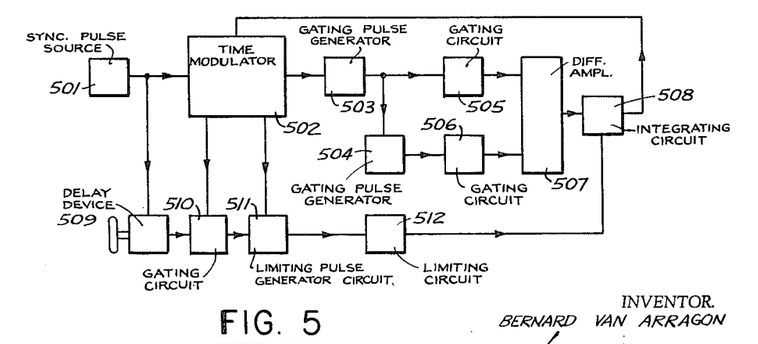
FIG. 5 shows a limiting circuit in which limiting takes place after an adjustable interval has elapsed.

FIG. 5 shows a block diagram in which the duration of the operative condition of the time modulator can be limited at an arbitrary adjustable minimum value. This circuit operates as follows. A pulse generator 501 generates synchronizing pulses which are applied to the time modulator 502, causing this time modulator to switch over to its working condition. After an interval which is determined by the control voltage produced by the device 508, the time modulator returns to its condition of rest, thereby applying a pulse to the gating pulse generator 503. This device then generates a gating pulse. This gating pulse is applied to a gating circuit 505 as well as to the second gating pulse generator 504, which, consequently, starts a second gating pulse at the moment the first one ends. This second gating pulse is applied to the second gating circuit 506. Both gating pulse circuits consequently become successively conductive during a short interval. Both gating circuits receive pulses to which they must remain synchronized and as far as these pulses overlap the gating pulses the gating circuit allows them to pass to integrating circuits so that voltages appear across these integrating circuits, the magnitudes of which are determined by the relative situation of gating pulses and applied pulses. The voltages across the integrating circuits are applied to a differential amplifier 507, which amplifies the difference between these voltages and applies the amplified voltage difference to a circuit 508 integrating with respect to time, which then generates the control voltage for the time modulator 502 in a well known way. The limiting action is effected in the following way. Each synchronizing pulse is also applied to a delay device 509. After it has received such a pulse, and a delay, which, for instance, can be manually adjusted has elapsed, this device applies, by way of a device 510, a pulse to the circuit 511 for the generating of limiting pulses. The device 509 may consist of a monostable trigger circuit, which is brought into its working condition by the synchronizing pulse and returns to its condition of rest after an adjustable interval. By differentiating a current variation occurring when this circuit returns to its condition of rest the pulse is generated at the end of the delay interval. As soon as the device 511 has received this pulse it starts the generation of the limiting pulse. This limiting pulse ends as soon as the time modulator returns to its condition of rest for which purpose this time modulator also applies a pulse to the device 511 when it returns to its condition of rest. The limiting pulses are applied to a limiting circuit 512, which may comprise a smoothing network as well as a cathode follower, the cathode circuit of which comprises a resistance and a condenser, as has been described with reference to FIG. 1. The voltage across the terminals of this condenser is applied in the way described in order to effect the limiting action. The limiting action occurs as soon as the duration of the limiting pulse has been reduced to a very short value, and consequently at the moment determined by the delay device 509. The circuit here described will not operate correctly when, for some reason, the control voltage has obtained a value for which the duration of the operative condition of the time modulator is shorter than the adjusted minimum interval. Such a condition can, for instance, occur when the system is put into operation and the control voltage accidentally has a value corresponding to such a duration, or when the minimum duration is suddenly increased by changing the adjustment of the device 509, causing this duration to exceed the duration of the operative condition of the time modulator corresponding to the control voltage available at the moment, for the adjustment of the device 509 might be changed at a higher rate than that corresponding to the highest possible rate of change of the control voltage. The pulse which should initiate the end of the limiting pulse would then have already been received before the beginning of the limiting pulse. This former pulse would then put an end to the previous limiting pulse, so that the limiting pulses would become very long and no limiting action would occur. The circuit would then continue its operation without adapting it to the newly adjusted value of the lower limit, although the duration of the operative condition of the time modulator is inferior to the said value. Without special measures the circuit described is only able to prevent the automatic regulation of the control voltage from adjusting this voltage to a value which is below a constant or slowly varying limit. The above problem can, however, be solved in the following simple way. Between the delay device 509 and the device 511, which generates the limiting pulses, a gating circuit 510 is inserted. This gating circuit is only open if the time modulator is in its operative condition. If the time modulator is no longer in its operative condition at the moment at which the delay device 509 endeavours to apply a pulse to the device 511, then this pulse cannot pass the gating circuit 510, so that no limiting pulse is generated. The limiting system 512 does not then receive limiting pulses and the condenser voltage obtains a value which has the largest possible difference from the limit value which can be reached under the influence of the limiting pulses. With such a voltage the limiting system immediately becomes operative, causing the control voltage to be adjusted at a value corresponding to the adjusted minimum duration of the operative condition of the time modulator.

It is obvious that the above problem can only occur in such circuits where it is possible for the limiting pulse to start later than the moment at which the time modulator switches over to its operative condition. This problem will, therefore, never occur in circuits in which the limiting pulse is generated by a part of the time modulator circuit itself and neither will it occur in circuits in which the limiting pulse, because of reasons described above, starts before the moment at which the time modulator switches over to its operative condition.

It is obvious that other methods can be applied in order to prevent the generation of a limiting pulse which begins after the time modulator has returned to its condition of rest. The device 511 may be controlled by a standard "and" circuit, which, for instance, only reacts if a pulse produced by the circuit 509 is received whilst the time modulator is in its operative condition. The circuit 511 might also be conceived in such a way that it can only become operative as long as the time modulator is in its operative condition. It will then only be caused to generate a limiting pulse by a pulse received from the circuit 509 if the time modulator is in its operative condition, and this pulse ends automatically as soon as the time modulator returns to its condition of rest, because afterwards the device 511 is no longer able to produce a pulse. If the pulse of the device 509 is supplied after the time modulator has returned to its condition of rest, the circuit 511 is not operative so that no limiting pulse is initiated. The device 511 may be a bi-stable trigger circuit, which receives pulses from the delay device to which it reacts by switching over to its operative condition, in which it generates the limiting pulse and which returns to its condition of rest after the reception of a pulse from the time modulator. It may also be a mono-stable trigger circuit which itself would remain longer in its operative condition than during the maximum duration of a limiting pulse, but is returned to its condition of rest by a pulse received from the time modulator.

If the limiting pulse is generated by a part of the time modulator it ends at the moment at which the time modulator returns to its condition of rest. If it is generated by a separate circuit, then a maximum duration of the limiting pulse may be established. Up to this maximum duration the duration of the limiting pulse grows in accordance with the duration of the operative condition of the time modulator. If the latter duration exceeds a maximum duration of the limiting pulse, however, the limiting pulse ends, although the time modulator still remains in its working condition. It is obvious that this phenomenon must not occur too early lest it should hamper the limiting action.

What I claim is:

1. In a delay circuit responsive to a trigger pulse supplied by a trigger pulse source, by effecting a change of its output voltage after a delay determined in duration by the value of a control voltage, a system for limiting the control voltage to values corresponding to delays above a certain minimum duration comprising a trigger circuit, a first connection between said trigger circuit and the source of trigger pulses, means in the trigger circuit responsive to the voltage change occurring in said connection as a result of the occurrence of a trigger pulse by switching the trigger circuit over to the first one of its two possible conditions, a second connection between the trigger circuit and the delay circuit, means in the delay circuit for applying a voltage change to said connection substantially at the moment at which the delayed change in the output voltage of the delay circuit occurs, means in the trigger circuit responsive to said voltage change applied to said connection by swtiching the trigger circuit back to the second one of its two possible conditions, a capacitance means bridged by an impedance such that even during the largest possible delay period of the delay circuit it only loses a relatively small portion of its charge, a charging circuit for said capacitance means having a small time constant and comprising a voltage controlled electronic switch, a control connection between said electronic switch and a point in the trigger circuit the voltage of which has different values in the two possible conditions of the trigger circuit, said electronic switch being controlled by the output voltage of said control connection to break the charging circuit when the voltage applied to the said connection has the value occurring in the second condition of the trigger circuit and to close it when the voltage applied to the said control connection has the value occurring in the first condition of the trigger circuit, and a second electronic switch controlled by the voltage of the capacitance means and connecting when the said voltage differs less than to a certain extent from its quiescent value, a point in a circuit carrying the control voltage of the delay circuit to a point the voltage of which has a value which is substantially equal to the value of the control voltage for the delay circuit which sets the delay to its minimum value.

2. In a delay circuit responsive to a trigger pulse supplied by a trigger pulse source, by effecting a change of its output voltage after a delay determined in duration by the value of a control voltage, a system for limiting the control voltage to values corresponding to delays above a certain minimum duration comprising a trigger circuit, a first connection between said trigger circuit and the source of trigger pulses, means in the trigger circuit responsive to the voltage change occuring in said connection as a result of the occurrence of a trigger pulse by switching the trigger circuit over to the first one of its two possible conditions, a second connection between the trigger circuit and the delay circuit, means in the delay circuit for applying a voltage change to said connection substantially at the moment at which the delayed change in the output voltage of the delay circuit occurs, means in the trigger circuit responsive to said voltage change applied to the said connection by switching the trigger circuit back to the second one of its two possible conditions, a capacitance means bridged by an impedance such that even during the largest possible delay period of the delay circuit it only loses a relatively small portion of its charge, a charging circuit for said capacitance means having a small time constant and comprising a voltage controlled electronic switch, a control connection between said electronic switch and a point in the trigger circuit the voltage of which has different values in the two possible conditions of the trigger circuit, said electronic switch being controlled by the output voltage of said control connection to break the charging circuit when the voltage applied to said connection has the value occurring in the second condition of the trigger circuit and to close it when the voltage applied to said control connection has the value occurring in the first condition of the trigger circuit, a smoothing circuit in the said control connection with a time constant such that after a change of the input voltage its output voltage only reaches the value corresponding to the changed input voltage after an interval of the same order as a permissible inaccuracy in the minimum duration of the delay of the delay circuit, and a second electronic switch controlled by the condenser voltage and connecting, when the said voltage differs less than to a certain extent from its quiescent value, a point in a circuit carrying the control voltage of the delay circuit to a point the voltage of which has a value which is substantially equal to the value of the control voltage of the delay circuit, which sets the delay to its minimum value.

3. In a delay circuit responsive to a trigger pulse supplied by a trigger pulse source, by effecting a change of its output voltage after a delay determined in duration by the value of a control voltage, a system for limiting the control voltage to values corresponding to delays above a certain minimum duration comprising a trigger circuit, a first connection between the trigger circuit and the source of trigger pulses, means in the trigger circuit responsive to the voltage change occurring in said connection as a result of the occurrence of a trigger pulse by switching the trigger circuit over to the first one of its two possible conditions, a second connection between the trigger circuit and the delay circuit, means in the delay circuit for applying a voltage change to said connection substantially at the moment at which the delayed change in the output voltage of the delay circuit occurs, means in the trigger circuit responsive to the said voltage change applied to said connection by switching the trigger circuit back to the second one of its two possible conditions, a capacitance means bridged by an impedance such that even during the largest possible delay period of the delay circuit it only loses a relatively small portion of its charge, a charging circuit for said capacitance means having a small time constant and comprising a cathode follower using the impedance bridging the capacitance means as cathode load, a control connection between the grid of said cathode follower and a point in the trigger circuit the voltage of which has different values in the two possible conditions of the trigger circuit, the grid voltage applied by said control connection reaching the cut-off value when the voltage applied to the control connection has the value occurring in the second condition of the trigger circuit and changes into a positive direction to permit the charging of the capacitance when the voltage applied to the connection has the value occurring in the first condition, of the trigger circuit, a smoothing circuit in said control connection with a time constant such that after a change in the input voltage the output voltage only reaches the value corresponding to the changed input voltage after an interval of the same order as a permissible inaccuracy in the minimum duration of the delay of the delay circuit, and an electronic switch controlled by the condenser voltage and connecting when the said voltage differs less than to a certain extent from its quiescent value, a point in a circuit carrying the control voltage of the delay circuit to a point the voltage of which has a value which is substantially equal to the value of the control voltage for the delay circuit which sets the delay to its minimum value.

4. In a delay circuit responsive to a trigger pulse supplied by a trigger pulse source, by effecting a change of its output voltage after a delay determined in duration by the value of a control voltage, a system for limiting the control voltage to values corresponding to delays above a certain minimum duration comprising a trigger circuit, a first connection between the trigger circuit and the source of trigger pulses, means in said trigger circuit responsive to the voltage change occurring in said connection as a result of the occurrence of a trigger pulse by switching the trigger circuit over to the first one of its two possible conditions, a second connection between the trigger circuit and the delay circuit, means in the delay circuit for applying a voltage change to said connection substantially at the moment at which the delayed change in the output voltage of the delay circuit occurs, means in the trigger circuit responsive to said voltage change applied to said connection by switching the trigger circuit back to the second one of its two possible conditions, a capacitance means bridged by an impedance, such that even during the largest possible delay period of the delay circuit it only loses a relatively small portion of its charge, a charging circuit for said capacitance means having a small time constant and comprising a diode, a control connection between the terminal of said diode away from the capacitance means and a point in the trigger circuit the voltage of which has different values in the two possible conditions of the trigger circuit, the control connection applying a voltage to the diode which blocks the same when the voltage applied to the control connection has the value occurring in the second condition of the trigger circuit, and renders the diode conductive thereby closing the charging circuit for the capacitance means when the voltage applied to the connection has the value occurring in the first condition of the trigger circuit, a smoothing circuit in said control connection with a time constant such that after a change in the input voltage its output voltage only reaches the value corresponding to the changed input voltage after an interval of the same order as the permitted inaccuracy in the minimum duration of the delay of the delay circuit, and a second electronic switch controlled by the voltage of the capacitance means and connecting when said voltage differs less than to a certain extent from its quiescent value, a point in a circuit carrying the control voltage of the delay circuit to a point the voltage of which has a value which is substantially equal to the value of the control voltage for the delay circuit which sets the delay to its minimum value.

5. In a delay circuit responsive to a trigger pulse supplied by a trigger pulse source, by effecting a change of its output voltage after a delay determined in duration by the value of a control voltage, a system for limiting the control voltage to values corresponding to delays above a certain minimum duration comprising a trigger circuit, a first connection between the trigger circuit and the source of trigger pulses, means in the trigger circuit responsive to the voltage change occuring in said connection as a result of the occurrence of a trigger pulse by switching the trigger circuit over to the first one of its two possible conditions, a second connection between the trigger circuit and the delay circuit, means in the delay circuit for applying a voltage change to said connection substantially at the moment at which the delayed change in the output voltage of the delay circuit occurs, means in the trigger circuit responsive to said voltage change applied to said connection by switching the trigger circuit back to the second one of its two possible conditions, a capacitance means bridged by an impedance such that even during the largest possible delay period of the delay circuit it only loses a relatively small portion of its charge, a charging circuit for said capacitance means having a time constant of the same order as a permissible inaccuracy in the minimum delay of the delay circuit and comprising a voltage controlled electronic switch, a control connection between said electronic switch and a point in the trigger circuit the voltage of which has different values in the two possible conditions of the trigger circuit, said electronic switch being controlled by the output voltage of said control connection to break the charging circuit when the voltage applied to said control connection has the value occurring in the second conditions of the trigger circuit and to close it when the voltage applied to said control connection has the value occurring in the first condition of the trigger circuit, and a second electronic switch controlled by the condenser voltage and connecting if the said voltage differs less than to a certain extent from its quiescent value, a point in a circuit carrying the control voltage of the delay circuit to a point the voltage of which has a value which is substantially equal to the value of the control voltage for the delay circuit which sets the delay to its minimum value.

6. In a delay circuit responsive to a trigger pulse supplied by a trigger pulse source, by effecting a change of its output voltage after a delay determined in duration by the value of a control voltage, a system for limiting the control voltage to values corresponding to delays above a certain minimum duration comprising a trigger circuit, a first connection between the trigger circuit and the source of trigger pulses, means in the trigger circuit responsive to the voltage change occurring in said connection as a result of the occurrence of a trigger pulse by switching the trigger circuit over to the first one of its two possible conditions, a second connection between the trigger circuit and the delay circuit, means in the delay circuit for applying a voltage change to said connection substantially at the moment at which the delayed change in the output voltage of the delay circuit occurs, means in the trigger circuit responsive to said voltage change, applied to said connection by switching the trigger circuit back to the second one of its two possible conditions, a capacitance means bridged by an impedance such that even during the largest possible delay period of the delay circuit it only loses a relatively small portion of its charge, a charging circuit for said capacitance means having a time constant of the order of a permissible inaccuracy in the minimum delay of the delay circuit and comprising a cathode follower using the impedance bridging the capacitance means as cathode load, a control connection between the grid of said cathode follower and a point in the trigger circuit the voltage of which has different values in the two possible conditions of the trigger circuit, the grid voltage applied by said control connection reaching the cut-off value when the voltage applied to the control connection has the value occurring in the second condition of the trigger circuit and changes into a positive direction thereby permitting the charging of the capacitance means when the voltage applied to the said connection has the value occurring in the first condition, and an electronic switch controlled by the voltage of the capacitance means and connecting when the said voltage differs less than to a certain extent from its quiescent value, a point in a circuit carrying the control voltage of the delay circuit to a point the voltage of which has a value which is substantially equal to the value of the control voltage for the delay circuit which sets the delay to its minimum value.

7. In a delay circuit responsive to a trigger pulse supplied by a trigger pulse source, by effecting a change of its output voltage after a delay determined in duration by the value of a control voltage, a system for limiting the control voltage to values corresponding to delays above a certain minimum duration comprising a trigger circuit, a first connection between the trigger circuit and the source of trigger pulses, means in the trigger circuit responsive to the voltage change occurring in said connection as a result of the occurrence of a trigger pulse by switching the trigger circuit over to the first one of its two possible conditions, a second connection between the trigger circuit and the delay circuit, means in the delay circuit for applying a voltage change to said connection substantially at the moment at which the delayed change in the output voltage of the delay circuit occurs, means in the trigger circuit reacting to said voltage change applied to said connection by switching the trigger circuit back to the second one of its two possible conditions, a capacitance means bridged by an impedance such that even during the largest possible delay period of the delay circuit it only loses a relatively small portion of its charge, a charging circuit for said capacitance means having a time constant of the same order as a permissible inaccuracy in the minimum delay of the delay circuit and comprising a diode, a control connection between the terminal of said diode away from the capacitance means and a point in the trigger circuit the voltage of which has different values in the two possible conditions of the trigger circuit, the control connection applying a voltage to the diode, which blocks it when the voltage applied to the control connection has the value occurring in the second condition of the trigger circuit, and renders the diode conductive to close the charging circuit for the capacitance means when the voltage applied to the connection has the value occurring in the first conditions of the trigger circuit, and a second electronic switch controlled by the voltage of the capacitance means and connecting when the said voltage differs less than to a certain extent from its quiescent value, a point in a circuit carrying the control voltage of the delay circuit to a point the voltage of which has a value which is substantially equal to the value of the control voltage for the delay circuit which sets the delay to its minimum value.

8. In a delay circuit responsive to a trigger pulse supplied by a trigger pulse source, by effecting a change of its output voltage after a delay determined in duration by the value of a control voltage, a system for limiting the control voltage to values corresponding to delays above a certain minimum duration comprising a trigger circuit, a first connection between said trigger circuit and the source of trigger pulses, means in the trigger circuit responsive to the voltage change occurring in said connection as a result of the occurrence of a trigger pulse by switching the trigger circuit over to the first one of its two possible conditions, a second connection between the trigger circuit and the delay circuit, means in the delay circuit for applying a voltage change to said connection substantially at the moment at which the delayed change in the output voltage of the delay circuit occurs, means in the trigger circuit responsive to said voltage change applied to said connection by switching the trigger circuit back to the second one of its two possible conditions, a capacitance means bridged by an impedance such that even during the largest possible delay period of the delay circuit it only loses a relatively small portion of its charge, a charging circuit for said capacitance means having a small time constant and comprising a voltage controlled electronic switch, a control connection between said electronic switch and a point in the trigger circuit the voltage of which has different values in the two possible conditions of the trigger circuit, said electronic switch being controlled by the output voltage of said control connection to break the charging circuit when the voltage applied to the said connection has the value occurring in the second condition of the trigger circuit and to close it when the voltage applied to the said control connection has the value occurring in the first condition of the trigger circuit, and a connection between a point of fixed potential and the one terminal of the capacitance means and a diode between the other terminal and a point in the circuit carrying the control voltage of the delay circuit, the directions of the voltages and the connections being such that the voltage change at the terminal of the capacitance means connected to the diode resulting from the charging of the capacitance means and the change in the control voltage of the delay circuit required for increasing the delay have opposite directions, whilst the direction in which the diode conducts and the value of the fixed potential are such that the diode is non-conductive for delays above the minimum value and becomes conductive when the delay reaches the minimum value.

9. In a delay circuit responsive to a trigger pulse supplied by a trigger pulse source, by effecting a change of its output voltage after a delay determined in duration by the value of a control voltage, a system for limiting the control voltage to values corresponding to delays above a certain minimum duration comprising a trigger circuit, a first connection between said trigger circuit and the source of trigger pulses, means in the trigger circuit responsive to the voltage change occurring in said connection as a result of the occurrence of a trigger pulse by switching the trigger circuit over to the first one of its two possible conditions, a second connection between the trigger circuit and the delay circuit, means in the delay circuit for applying a voltage change to said connection substantially at the moment at which the delayed change in the output voltage of the delay circuit occurs, means in the trigger circuit responsive to said voltage change applied to the said connection by switching the trigger circuit back to the second one of its two possible conditions, a capacitance means bridged by an impedance such that even during the largest possible delay period of the delay circuit it only loses a relatively small portion of its charge, a charging circuit for said capacitance means having a small time constant and comprising a voltage controlled electronic switch, a control connection between said electronic switch and a point in the trigger circuit the voltage of which has different values in the two possible conditions of the trigger circuit, said electronic switch being controlled by the output voltage of said control connection to break the charging circuit when the voltage applied to said connection has the value occurring in the second condition of the trigger circuit and to close it when the voltage applied to said control connection has the value occurring in the first condition of the trigger circuit, a smoothing circuit in the said control connection with a time constant such that after a change of the input voltage its output voltage only reaches the value corresponding to the changed input voltage after an interval of the same order as a permissible inaccuracy in the minimum duration of the delay of the delay circuit, and a second electronic switch controlled by the condenser voltage and connecting, when the said voltage differs less than to a certain extent from its quiescent value, a point in a circuit carrying the control voltage of the delay circuit to a point the voltage of which has a value which is substantially equal to the value of the control voltage of the delay circuit, which sets the delay to its minimum value and a delay element between the source of trigger pulses and the delay circuit causing the reaction of the delay circuit to the trigger pulses to be delayed with respect to that of the trigger circuit by an interval which is smaller than the delay caused by the smoothing circuit.

10. In a delay circuit responsive to a trigger pulse supplied by a trigger pulse source, by effecting a change of its output voltage after a delay determined in duration by the value of a control voltage, a system for limiting the control voltage to values corresponding to delays above a certain minimum duration comprising a trigger circuit, a first connection between the trigger circuit and the source of trigger pulses, means in the trigger circuit responsive to the voltage change occurring in said connection as a result of the occurrence of a trigger pulse by switching the trigger circuit over to the first one of its two possible conditions, a second connection between the trigger circuit and the delay circuit, means in the delay circuit for applying a voltage change to said connection substantially at the moment at which the delayed change in the output voltage of the delay circuit occurs, means in the trigger circuit responsive to said voltage change applied to said connection by switching the trigger circuit back to the second one of its two possible conditions, a capacitance means bridged by an impedance such that even during the largest possible delay period of the delay circuit it only loses a relatively small portion of its charge, a charging circuit for said capacitance means having a time constant of the same order as a permissible inaccuracy in the minimum delay of the delay circuit and comprising a voltage controlled electronic switch, a control connection between said electronic switch and a point in the trigger circuit the voltage of which has different values in the two possible conditions of the trigger circuit, said electronic switch being controlled by the output voltage of said control connection to break the charging circuit when the voltage applied to said control connection has the value occurring in the second condition of the trigger circuit and to close it when the voltage applied to said control connection has the value occurring in the first condition of the trigger circuit, and a second electronic switch controlled by the condenser voltage and connecting if the said voltage differs less than to a certain extent from its quiescent value, a point in a circuit carrying the control voltage of the delay circuit to a point the voltage of which has a value which is substantially equal to the value of the control voltage for the delay circuit which sets the delay to its minimum value and a delay element between the source of trigger pulses and the delay circuit causing the reaction of the delay circuit to be delayed with respect to that of the trigger circuit by an interval which is smaller than the charging time of the capacitance means resulting from the time constant of the charging circuit.

11. In a delay circuit responsive to a trigger pulse supplied by a trigger pulse source, by effecting a change of its output voltage after a delay determined in duration by the value of a control voltage, a system for limiting the control voltage to values corresponding to delays above a certain minimum duration comprising a trigger circuit, a first connection comprising an adjustable delay element between said trigger circuit and the source of trigger pulses, means in the trigger circuit responsive to the voltage change occurring in said connection as a result of the occurrence of a trigger pulse by switching the trigger circuit over to the first one of its two possible conditions, a second connection between the trigger circuit and the delay circuit, means in the delay circuit for applying a voltage change to said connection substantially at the moment at which the delayed change in the output voltage of the delay circuit occurs, means in the trigger circuit responsive to said voltage change applied to said connection by switching the trigger circuit back to the second one of its two possible conditions, a capacitance means bridged by an impedance such that even during the longest possible delay period of the delay circuit it only loses a relatively small portion of its charge, a charging circuit for said capacitance means having a small time constant and comprising a voltage controlled electronic switch, a control connection between said electronic switch and a point in the trigger circuit the voltage of which has different values in the two possible conditions of the trigger circuit, said electronic switch being controlled by the output voltage of said control connection to break the charging circuit when the voltage applied to the said connection has the value occurring in the second condition of the trigger circuit and to close it when the voltage applied to the said control connection has the value occurring in the first condition of the trigger circuit, and a second electronic switch controlled by the voltage of the capacitance means and connecting when the said voltage differs less than to a certain extent from its quiescent value, a point in a circuit carrying the control voltage of the delay circuit to a point the voltage of which has a value which is substantially equal to the value of the control voltage for the delay circuit which sets the delay to its minimum value.

12. In a delay circuit responsive to a trigger pulse supplied by a trigger pulse source, by effecting a change of its output voltage after a delay determined in duration by the value of a control voltage, a system for limiting the control voltage to values corresponding to delays above a certain minimum duration comprising a trigger circuit, a first connection between said trigger circuit and the source of trigger pulses, means in the trigger circuit responsive to the voltage change occurring in said connection as a result of the occurrence of a trigger pulse by switching the trigger circuit over to the first one of its two possible conditions, a second connection between the trigger circuit and the delay circuit, means in the delay circuit for applying a voltage change to said connection substantially at the moment at which the delayed change in the output voltage of the delay circuit occurs, means in the trigger circuit responsive to said voltage change applied to the said connection by switching the trigger circuit back to the second one of its two possible conditions, a capacitance means bridged by an impedance such that even during the longest possible delay period of the delay circuit it only loses a relatively small portion of its charge, a charging circuit for said capacitance means having a small time constant and comprising a voltage controlled electronic switch, a control connection between said electronic switch and a point in the trigger circuit the voltage of which has different values in the two possible conditions of the trigger circuit, said electronic switch being controlled by the output voltage of said control connection to break the charging circuit when the voltage applied to said connection has the value occurring in the second condition of the trigger circuit and to close it when the voltage applied to said control connection has the value occurring in the first condition of the trigger circuit, a smoothing circuit in the said control connection with a time constant such that after a change of the input voltage its output voltage only reaches the value corresponding to the changed input voltage after an interval of the same order as a permissible inaccuracy in the minimum duration of the delay of the delay circuit, and a second electronic switch controlled by the condenser voltage and connecting, when the said voltage differs less than to a certain extent from its quiescent value, a point in a circuit carrying the control voltage of the delay circuit to a point the voltage of which has a value which is substantially equal to the value of the control voltage of the delay circuit, which sets the delay to its minimum value a pulse generator, and a circuit connection between said pulse generator and the source of synchronizing pulses by means of which the synchronizing pulses trigger the pulse generator, and a delay element in said connection delaying said trigger action of the synchronizing pulses by an interval which is smaller than the delay caused by the smoothing circuit.

13. In a delay circuit responsive to a trigger pulse supplied by a trigger pulse source, by effecting a change of its output voltage after a delay determined in duration by the value of a control voltage, a system for limiting the control voltage to values corresponding to delays above a certain minimum duration comprising a trigger circuit, a first connection between the trigger circuit and the source of trigger pulses, means in the trigger circuit responsive to the voltage change occurring in said connection as a result of the occurrence of a trigger pulse by switching the trigger circuit over to the first one of its two possible conditions, a second connection between the trigger circuit and the delay circuit, means in the delay circuit for applying a voltage change to said connection substantially at the moment at which the delayed change in the output voltage of the delay circuit occurs, means in the trigger circuit responsive to said voltage change applied to said connection by switching the trigger circuit back to the second one of its two possible conditions, a capacitance means bridged by an impedance such that even during the longest possible delay period of the delay circuit it only loses a relatively small portion of its charge, a charging circuit for said capacitance means having a time constant of the same order as a permissible inaccuracy in the minimum delay of the delay circuit and comprising a voltage controlled electronic switch, a control connection between said electronic switch and a point in the trigger circuit the voltage of which has different values in the two possible conditions of the trigger circuit, said electronic switch being controlled by the output voltage of said control connection to break the charging circuit when the voltage applied to said control connection has the value occurring in the second condition of the trigger circuit and to close it when the voltage applied to said control connection has the value occurring in the first condition of the trigger circuit, a second electronic switch controlled by the condenser voltage and connecting if the said voltage differs less than to a certain extent from its quiescent value, a point in a circuit carrying the control voltage of the delay circuit to a point the voltage of which has a value which is substantially equal to the value of the control voltage for the delay circuit which sets the delay to its minimum value, a pulse generator, a connection between said pulse generator and the source of synchronizing pulses by means of which the synchronizing pulses trigger the pulse generator, and a delay element in said connection delaying said trigger action of the synchronizing pulses by an interval which is smaller than the delay of the charge of the capacitance means caused by the time constant of the charging circuit of said capacitance means.

14. In a delay circuit responsive to a trigger pulse supplied by a trigger pulse source, by effecting a change of its output voltage after a delay determined in duration by the value of a control voltage, a system for limiting the control voltage to values corresponding to delays above a certain minimum duration comprising a trigger circuit, a first connection between said trigger circuit and the source of trigger pulses, means in the trigger circuit responsive to the voltage change occurring in said connection as a result of the occurrence of a trigger pulse by switching the trigger circuit over to the first one of its two possible conditions, a second connection between the trigger circuit and the delay circuit, means in the delay circuit for applying a voltage change to said connection substantially at the moment at which the delayed change in the output voltage of the delay circuit occurs, means in the trigger circuit responsive to said voltage change applied to said connection by switching the trigger circuit back to the second one of its two possible conditions, a capacitance means bridged by an impedance such that even during the largest possible delay period of the delay circuit it only loses a relatively small portion of its charge, a charging circuit for said capacitance means having a small time constant and comprising a voltage controlled electronic switch, a control connection between said electronic switch and a point in the trigger circuit the voltage of which has different values in the two possible conditions of the trigger circuit, said electronic switch being controlled by the output voltage of said control connection to break the charging circuit when the voltage applied to the said connection has the value occurring in the second condition of the trigger circuit and to close it when the voltage applied to the said control connection has the value occurring in the first condition of the trigger circuit, a second electronic switch controlled by the voltage of the capacitance means and connecting when the said voltage differs less than to a certain extent from its quiescent value, a point in a circuit carrying the control voltage of the delay circuit to a point the voltage of which has a value which is substantially equal to the value of the control voltage for the delay circuit which sets the delay to its minimum value, and a Miller integrator between the circuit carrying the control voltage for the delay circuit and the point at which this voltage controls the delay by way of which integrator the control of the delay is effected.

15. In a delay circuit responsive to a trigger pulse supplied by a trigger pulse source, by effecting a change of its output voltage after a delay determined in duration by the value of a control voltage, a system for limiting the control voltage to values corresponding to delays above a certain minimum duration, comprising a trigger circuit, a first connection between said trigger circuit and the source of trigger pulses, means in the trigger circuit responsive to the voltage change occurring in said connection as a result of the occurrence of a trigger pulse by switching the trigger circuit over to the first one of its two possible conditions, a second connection between the trigger circuit and the delay circuit, means in the delay circuit for applying a voltage change to said connection substantially at the moment at which the delayed change in the output voltage of the delay circuit occurs, means in the trigger circuit responsive to said voltage change applied to said connection by switching the trigger circuit back to the second one of its two possible conditions, a capacitance means bridged by an impedance such that even during the largest possible delay period of the delay circuit it only loses a relatively small portion of its charge, a charging circuit for said capacitance means having a small time constant and comprising a voltage controlled electronic switch, a control connection between said electronic switch and a point in the trigger circuit the voltage of which has different values in the two possible conditions of the trigger circuit, said electronic switch being controlled by the output voltage of said control connection to break the charging circuit when the voltage applied to the said connection has the value occurring in the second condition of the trigger circuit and to close it when the voltage applied to the said control connection has the value occurring in the first condition of the trigger circuit, and a second electronic switch controlled by the voltage of the capacitance means and connecting when the said voltage differs less than to a certain extent from its quiescent value, a point in a circuit carrying the control voltage of the delay circuit to a point the voltage of which has a fixed value which is substantially equal to that value of the control voltage of the delay circuit which sets the delay to its minimum value.

References Cited in the file of this patent
UNITED STATES PATENTS

| | | |
|---|---|---|
| 2,498,677 | Grieg | Feb. 28, 1950 |
| 2,519,083 | Sutter et al. | Aug. 15, 1950 |
| 2,879,503 | Green et al. | Mar. 24, 1959 |